United States Patent [19]

Starling

[11] Patent Number: 5,281,090
[45] Date of Patent: Jan. 25, 1994

[54] THERMALLY-TUNED ROTARY LABYRINTH SEAL WITH ACTIVE SEAL CLEARANCE CONTROL

[75] Inventor: Tracy Starling, Harrison, Ohio

[73] Assignee: General Electric Co., Cincinnati, Ohio

[21] Appl. No.: 505,117

[22] Filed: Apr. 3, 1990

[51] Int. Cl.⁵ ............................................. F01D 11/00
[52] U.S. Cl. ............................... 415/173.7; 415/174.5; 277/3; 277/53; 277/75
[58] Field of Search ............... 415/170.1, 171.1, 173.1, 415/173.7, 174.5; 277/3, 53, 75

[56] References Cited

U.S. PATENT DOCUMENTS

| | | | |
|---|---|---|---|
| 4,513,975 | 4/1985 | Hauser et al. | 277/22 |
| 4,526,508 | 7/1985 | Antonellis et al. | 415/173.7 |
| 4,662,821 | 5/1987 | Kervistin et al. | 415/174.5 |
| 4,668,163 | 5/1987 | Kervistin . | |

FOREIGN PATENT DOCUMENTS 0177408B 8/1988 European Pat. Off. .

*Primary Examiner*—Edward K. Look
*Assistant Examiner*—Christopher Verdier
*Attorney, Agent, or Firm*—Jerome C. Squillaro; Nathan D. Herkamp

[57] ABSTRACT

A thermally-tuned rotary labyrinth seal for a gas turbine engine includes an inner annular seal member having axially spaced, radially projecting annular seal teeth, and an outer annular seal member having a stepped honeycomb structure which face the annular seal teeth of the inner seal member and define therewith axially spaced regions bounded by the seal teeth and honeycomb structure. The seal teeth and stepped honeycomb structure cooperate to inhibit gas flow from one region to the next. Also, the seal has inlet and outlet vent holes defined through the honeycomb structure at respective upstream and downstream ends thereof which communicate with correspondingly located ones of the regions. The inlet and outlet vent holes are aligned along respective planes extending radially relative to a longitudinal axis of the engine and the holes are disposed at angles extending in tangential directions along the radial planes. Further, the seal includes an annular housing attached on an outer side of the honeycomb structure which defines a single axially elongated annular cavity spanning the honeycomb structure. The cavity interconnects in flow communication the inlet and outlet vent holes for providing gas flow in heat transfer relationship along the outer side of the honeycomb structure from the inlet vent holes to the outlet vent holes to provide active seal clearance control.

3 Claims, 3 Drawing Sheets

THERMALLY-TUNED ROTARY LABYRINTH SEAL WITH ACTIVE SEAL CLEARANCE CONTROL

CROSS-REFERENCE TO RELATED APPLICATIONS

Reference is hereby made to the following copending U.S. patent applications dealing with related subject matter and assigned to the assignee of the present invention:

1. "Counter Rotation Power Turbine" by Kenneth O. Johnson, assigned U.S. application Ser. No. 071,594, filed Jul. 10, 1987, a continuation of application Ser. No. 728,466 and filed May 1, 1985, now abandoned, which was a continuation-in-part of application Ser. No. 437,923, filed Nov. 1, 1982, now abandoned.

2. "Interstage Seal Arrangement For Airfoil Stages of Turbine Engine Counterrotating Rotors" by Przytulski et al., assigned U.S. application Ser. No. 07/505,120 and filed concurrently herewith.

3. "Turbine Blade Outer End Attachment Structure" by Przytulski et al., assigned U.S. application Ser. No. 07/505,118 and filed concurrently herewith.

4. "Turbine Blade Inner End Attachment Structure" by Przytulski et al., assigned U.S. application Ser. No. 07/505,121 and filed concurrently herewith.

BACKGROUND OF THE INVENTION
1. Field of the Invention

The present invention relates generally to gas turbine engines and, more particularly, is concerned with a thermally-tuned rotary labyrinth seal for a gas turbine engine.

2. Description of the Prior Art

Gas turbine engines generally include a gas generator which comprises a compressor for compressing air flowing aft through the engine, a combustor in which fuel is mixed with the compressed air and ignited to form a high energy gas stream, and a turbine driven by the gas stream and connected for driving a rotor which, in turn, drives the compressor. Many engines further include a second turbine, known as a power turbine, located aft of the gas generator and which extracts energy from the gas flow to drive a rotating load with variable pitch blades such as found in the propulsor of helicopters, ducted turbofan engines, and turboprop engines.

A recent improvement over the turbofan and turboprop engines is an unducted fan engine such as disclosed in the first U.S. patent application cross-referenced above. In the unducted fan engine, the power turbine includes counterrotating rotors with turbine blades defining counterrotating airfoil stages which drive in corresponding fashion unducted fan blades radially located with respect to the power turbine. The fan blades of the unducted fan engine are variable pitched blades to achieve optimum performance. During operation, fuel efficiency of the engine can be increased by varying the pitch of the blade to correspond to specific operating conditions.

In order to minimize engine performance losses due to leakage of pressure to outside the flowpath from between a stationary casing and the rotary outer rotor at a relatively high pressure upstream region of the flowpath through the power turbine, a single labyrinth seal has been used between the casing and rotor to deter passage of air. One typical prior art labyrinth seal is composed of a plurality of seal teeth axially spaced, circumferentially extending and outwardly projecting on an annular shaped rim attached to the rotary rotor and a stepped honeycomb structure attached to the stationary casing which sealably interface with the teeth.

However, the seal is located in a thermal environment where the temperature of the teeth is influenced by the higher temperature rotor in contact with the hot gas flow, whereas the temperature of the honeycomb structure is influenced by the lower temperature casing in contact with outside air. This produces a temperature differential between the seal parts which creates a problem. The inner teeth-bearing rim undergoes faster thermal growth than the outer honeycomb structure. This results in increased rubbing of the teeth against the honeycomb structure which makes seal clearance control more difficult.

One approach to solving this problem is presented in U.S. Pat. No. 4,513,975 to Hauser et al, assigned to the same assignee as the present invention. In the Hauser et al patent, a series of axially spaced conduits are provided which join upstream with downstream regions defined by the steps of the stationary honeycomb structure and the teeth on the rotary rotor. The conduits conduct a portion of hot gas from the upstream regions to the downstream regions. Each conduit includes an annular cavity with pluralities of inlet and outlet passages offset circumferentially from one another. Each inlet passage is aligned along a radius of the engine, whereas each outlet passage is aligned within an axial plane and extends at an acute angle relative to the engine axis.

As the temperature of the gas increases, the gas portion passing through each conduit from the upstream region assists the downstream region to heat more rapidly. The objective is to increase the rate of heat transfer between seal members and decrease the time it takes to reach thermal equilibrium.

The approach of the above-cited patent is a step in the right direction toward reducing the problem of differential thermal growth between the seal members and its deleterious effects. However, it is perceived that further improvements are needed in this approach in order to devise a practical solution to the problem.

SUMMARY OF THE INVENTION

The present invention provides an improved thermally-tuned rotary labyrinth seal designed to satisfy the aforementioned needs. The rotary seal of the present invention includes features allowing thermal tuning of the relatively rotating seal members for active seal clearance control.

These features include a housing attached on the outer side of the stepped honeycomb structure of the outer stationary seal member and defining a single cavity, and a plurality of inlet and outlet vent holes spanned by the single cavity and extending through the honeycomb structure between the housing cavity and regions defined between the interiors of the seal members at upstream and downstream ends of the seal. The vent holes are aligned in radial planes and angled in a tangential direction with such planes relative to the engine axis.

The seal is thermally tuned by selecting the number of holes to be made through the outer seal member and the tangential angle of the holes. By adjusting the angle of the holes it is possible to adjust the velocity of the gas flowing through the holes and cavity and thereby match the film coefficients of the portions of the rotor and stationary casing containing the seal members so that the members will thermally grow together and thereby provide an active clearance control on the seal. The actively heated cavity outwardly of the casing seal member tends to create a more stable environment throughout the seal and allows for more uniform, and faster growth, and thus better clearance control yielding improved sealing and engine performance.

Accordingly, the present invention is directed to a thermally-tuned rotary seal for a gas turbine engine which comprises: (a) an inner annular seal member having a plurality of axially spaced, radially projecting annular seal elements; (b) an outer annular seal member having a stepped honeycomb structure facing the annular seal elements of the inner seal member and defining therewith a series of axially spaced regions bounded by the seal elements and honeycomb structure, the annular seal elements of the inner seal member and the stepped honeycomb structure of the outer seal member cooperating to inhibit flow of gas from one region to the next; (c) means defining a plurality of inlet and outlet vent holes through the honeycomb structure at respective upstream and downstream ends thereof which communicate with corresponding ones of the regions; and (d) an annular housing attached on an outer side of the honeycomb structure and defining a single axially elongated annular cavity spanning the honeycomb structure axially from an upstream end to a downstream end thereof and interconnecting in flow communication the inlet and outlet vent holes adjacent the upstream and downstream ends of the honeycomb structure for providing gas flow in heat transfer relationship along the outer side of the honeycomb structure from the inlet vent holes to the outlet vent holes.

More particularly, the inlet vent holes adjacent the upstream end of the honeycomb structure are aligned along at least one plane extending radially relative to a longitudinal axis of the engine. The inlet vent holes also are disposed at an angle extending in a tangential direction along the radial plane. The outlet vent holes adjacent the downstream end of the honeycomb structure are aligned along at least one plane extending radially relative to a longitudinal axis of the engine. The outlet vent holes also are disposed at an angle extending in a tangential direction along the radial plane.

These and other features and advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
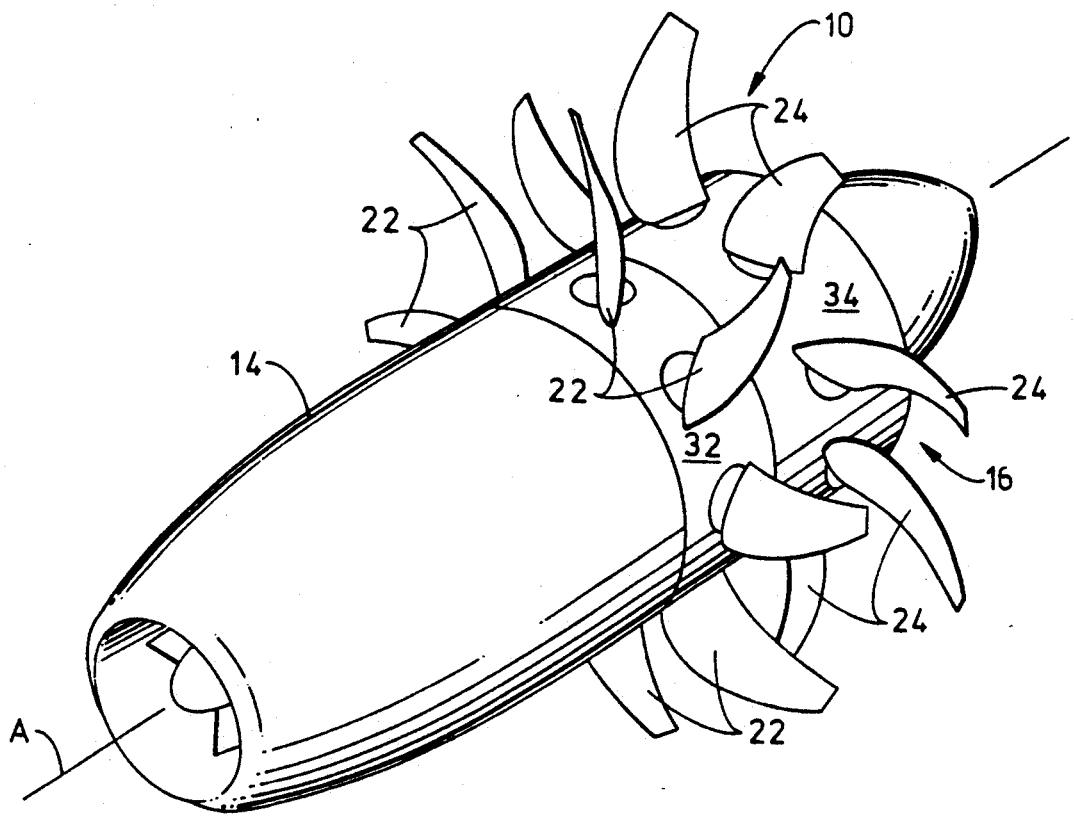
FIG. 1 is a perspective view an unducted fan type gas turbine engine in which the thermally-tuned rotary labyrinth seal of the present invention can be employed.

In the following description, like reference characters designate like or corresponding parts throughout the several views. Also in the following description, it is to be understood that such terms as "forward", "rearward", if "left" "@fright", "upwardly", "downwardly", and the like, are words of convenience and are not to be construed as limiting terms.

IN GENERAL

Figure 2:
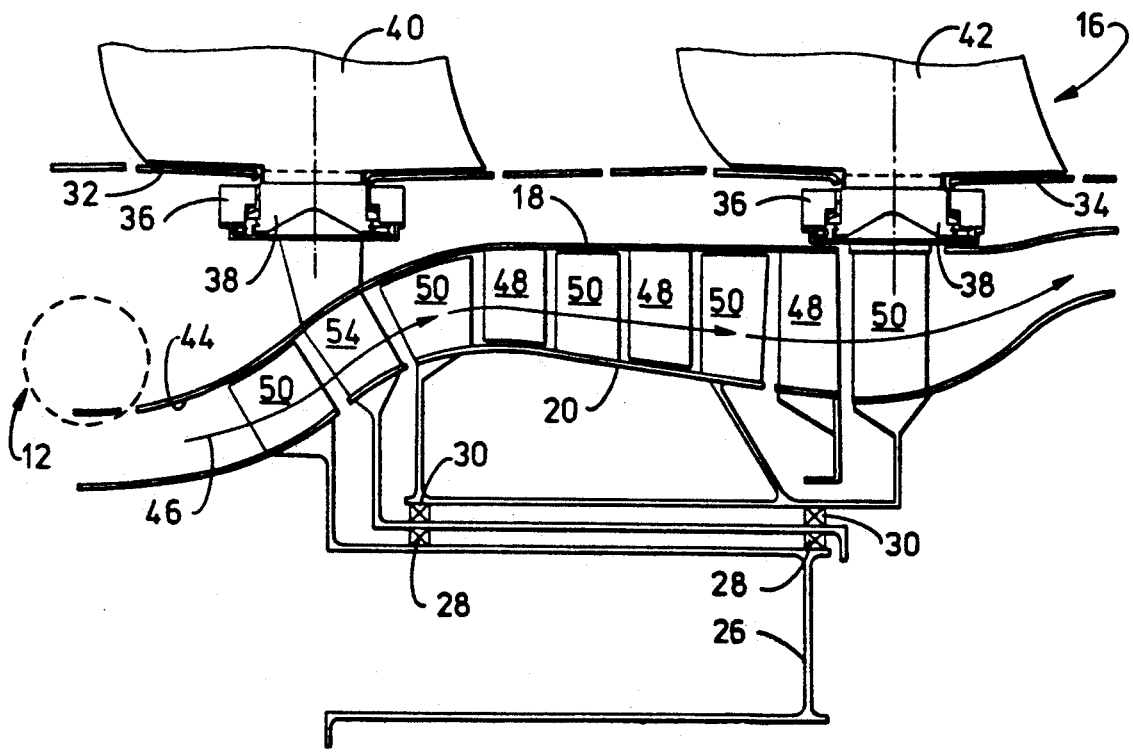
FIG. 2 is a schematic axial sectional view of a turbine section of the unducted fan engine of FIG. 1.
Figure 3:
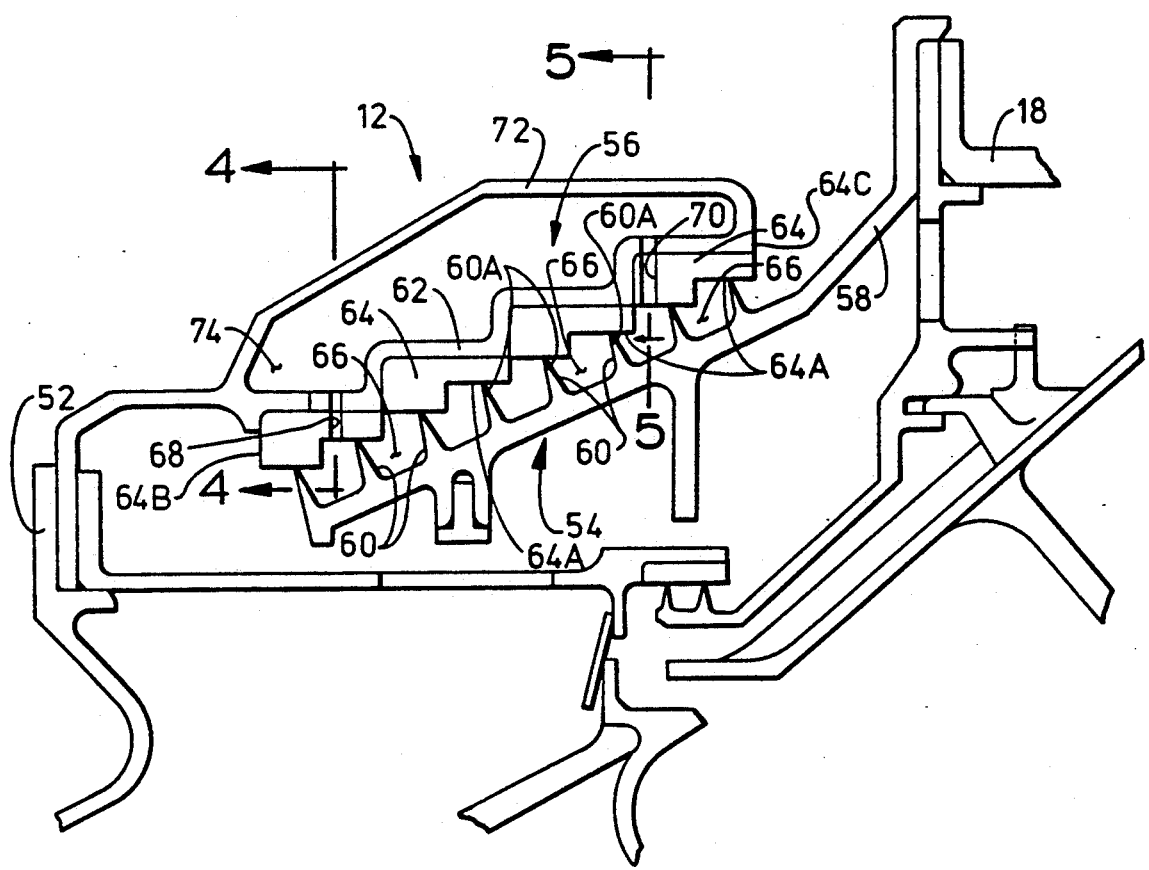
FIG. 3 is an enlarged fragmentary detailed view of the portion of turbine section encircled in FIG. 2.

Referring now to the drawings, and particularly, to FIG. 1, there is shown a gas turbine engine 10 of the unducted fan type which incorporates the preferred embodiment of the thermally-tuned rotary labyrinth seal of the present invention, generally designated 12 in FIG. 3. The engine 10 has an outer shroud or nacelle 14 which encompasses a forward gas generator (not shown) and an aft power turbine 16, illustrated schematically in FIG. 2. In a known manner, the gas generator produces combustion gases which are channeled to the power turbine 16.

As seen in FIG. 2, the power turbine 16 includes outer and inner annular turbine rotors 18, 20 which are adapted to rotate in opposite directions, or counterrotate, about a longitudinal centerline axis A of the engine 10. The rotors 18, 20 respectively mount for rotation therewith tandemly arranged forward and rearward sets of propulsor blades 22, 24. The outer rotor 18 is rotatably mounted about a hollow static structure 26 of the engine 10 by a first set of bearings 28, whereas the inner rotor 20 is rotatably mounted within the outer rotor 18 by a second set of bearings 30.

The nacelle 14 encompasses the rotors 18, 20 with the sets of propulsor blades 22, 24 extending circumferentially and radially outward from the exterior of the nacelle 14. The nacelle 14 includes a forward sleeve 32 which is coupled to and rotatable with the forward set of propulsor blades 22, and a rearward sleeve 34 which is coupled to and rotatable with the rearward set of propulsor blades 24. The exterior configuration of the nacelle 14 provides proper air flow characteristics to optimize the performance of the propulsor blades 22, 24 and thereby of the engine 10.

To further optimize the performance of the engine 10, the pitch of the propulsor blades 22, 24 can be varied to correspond to specific operating conditions. The blades 22, 24 of the forward and rearward sets thereof are rotatably mounted by hubs 36 to the interior sides of the forward and rearward nacelle sleeves 32, 34 and coupled to pitch varying mechanisms 38 operable for rotating the blades 22, 24 about respective pitch change axes 40, 42. Attention is directed to U.S. Pat. No. 4,738,590, which issued to Butler and is assigned to the assignee of the present invention, for gaining a detailed understanding of the blade pitch varying mechanisms.

The aft power turbine 16 also has an annular gas flowpath 44 for receiving combustion gases from the forward gas generator of the engine 10. The gas flowpath 44 extends between the outer and inner rotors 18, 20 of the power turbine 16 and combustion gases flow therethrough as a high energy gas stream 46. The rotors 18, 20 of the power turbine 16 respectively mount, via attachment structures (not shown), axially spaced rows of circumferentially and radially extending turbine blades 48, 50 which alternate with one another so as to define counterrotatable airfoil stages extending across the annular gas flowpath 44. Also, outer and inner interstage seal structures (not shown) are provided for preventing passage of the gas stream 46 between the outer and inner rotors 18, 20 and outer and inner ends of the respective turbine blades 50, 48.

Thus, the high energy gas stream 46 flowing through the annular gas flowpath 44 between the rotors 18, 20 causes the sets of turbine blades 48, 50 to turn or move in opposite directions about circular paths, in turn, causing the respective rotors 18, 20 to counterrotate and correspondingly counterrotatably drive the sets of propulsor blades 22, 24.

THERMALLY-TUNED ROTARY LABYRINTH SEAL OF THE PRESENT INVENTION

In order to minimize engine performance losses due to leakage of the gas stream 46 from the flowpath 44 through the space between a stationary casing 52 and the outer rotor 18, the thermally-tuned labyrinth rotary seal 12 of the present invention is provided, as seen in FIG. 3. The rotary seal 12 is composed of inner and outer seal members 54, 56 and features allowing thermal tuning of the relative rotating seal members for active seal clearance control.

More particularly, the inner seal member 54 includes an annular rim portion 58 attached to the upstream end of the outer rotor 18 and a plurality of axially spaced, radially outwardly projecting annular ring-shaped seal teeth 60 attached on the rim portion 58. The outer seal member 56 includes a step-shaped base plate 62 with a stepped honeycomb structure 64 attached thereon and facing the tips 60A of the annular seal teeth 60 of the inner seal member 54. Defined and bounded by the rim portion 58, seal teeth 60 and honeycomb structure 64 are a series of axially spaced annular regions 66. Ideally, the tips 60A of the annular seal teeth 60 of the inner seal member 54 and the facing surfaces 64A of the stepped honeycomb structure 64 of the outer seal member 56 cooperate in a known manner to inhibit flow of gas from one region 66 to the next.

The features of the seal 12 allowing thermal tuning of the relatively rotating seal members 54, 56 for providing an active seal clearance control include a plurality of inlet and outlet vent holes 68, 70 formed through the honeycomb structure 64 and an annular housing 72 attached on an outside of the base plate 62 and honeycomb structure 64 of the outer seal member 56. The inlet and outlet vent holes 68, 70 are preferably circular in cross-sectional shape and located adjacent respective upstream and downstream ends of the honeycomb structure 64 and communicate with correspondingly-located ones of the regions 66.

The annular housing 72 attached on the outer side of the honeycomb structure 64 defines a single axially elongated annular cavity 74 spanning the honeycomb structure 64 axially from an upstream end 64B to a downstream end 64C thereof. Also, the cavity 74 interconnects in flow communication the inlet and outlet vent holes 68, 70 for providing gas flow in heat transfer relationship along the outer side of the honeycomb structure 64 from the inlet vent holes 68 to the outlet vent holes 70.

Figure 4:
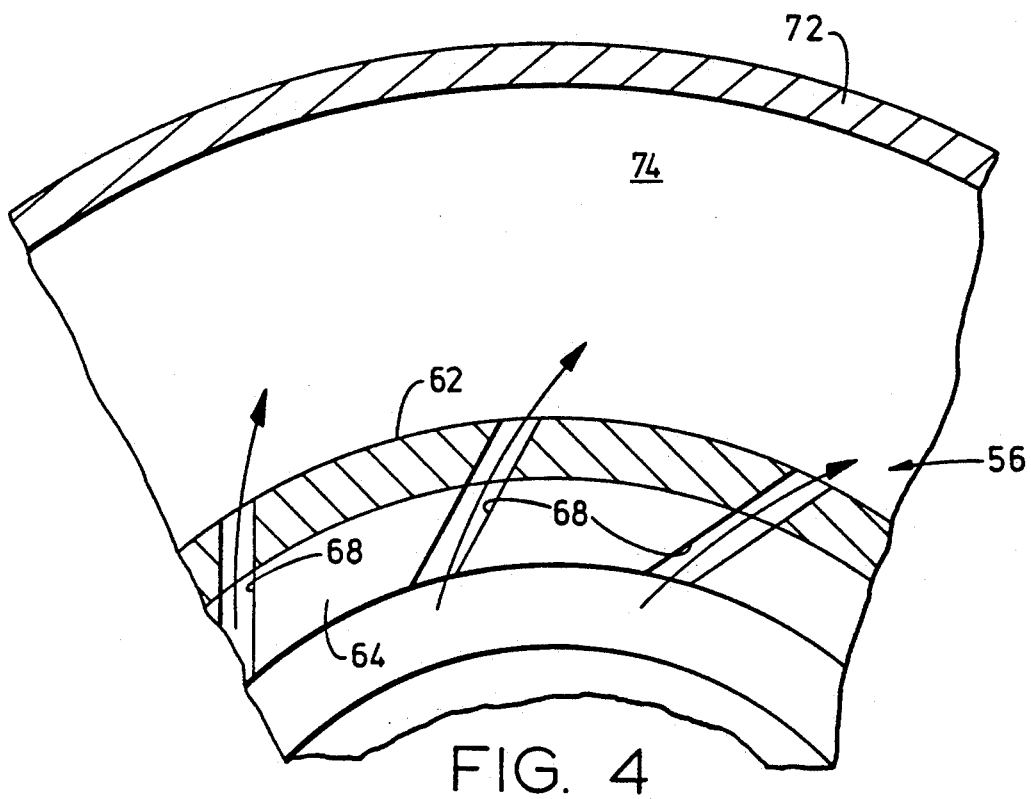
FIG. 4 is an enlarged fragmentary sectional view of the turbine section portion taken along line 4—4 of FIG. 3.
Figure 5:
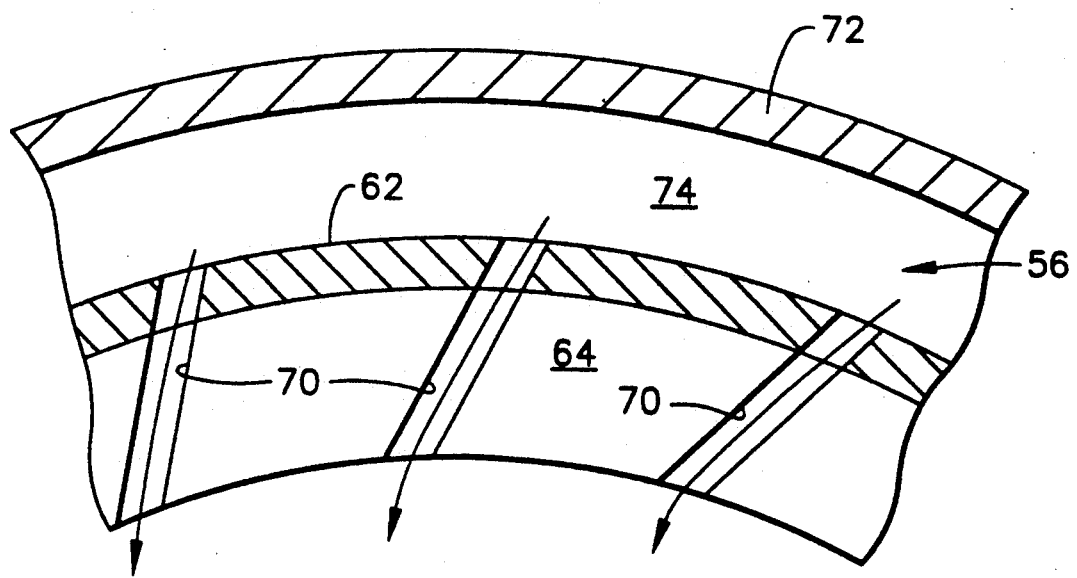
FIG. 5 is an enlarged fragmentary sectional view of the turbine section portion taken along 5—5 of FIG. 3.

The inlet vent holes 68 adjacent the upstream end 64B of the honeycomb structure 64 are aligned along at least one plane extending transversely and radially relative to the longitudinal axis A of the engine 10. As seen in FIG. 4, the inlet vent holes 68 also are disposed at an angle extending in a generally tangential direction along the radial plane which is the same as the plane of the figure. The outlet vent holes 70 adjacent the downstream end 64C of the honeycomb structure 64 are aligned along at least one plane extending radially relative to the longitudinal axis A of the engine 10. As seen in FIG. 5, the outlet vent holes 70 also are disposed at an angle extending in a generally tangential direction along the radial plane similar to the inlet vent holes 68.

The seal 12 is thermally tuned by selecting the number of holes 68,70 to be made through the outer seal member 56 and the tangential angle of the holes. Thermal tuning refers to thermally matching the area within the housing cavity 74 on the outer side of the honeycomb structure 64 with the area of the regions 66 on the inner side of the honeycomb structure 64. Since the two areas are a given, it is the film coefficients for the two areas that must be matched. The film coefficients can be manipulated to achieve thermal matching by adjusting or manipulating the velocity of gas flow through the holes 68, 70. The velocity can be adjusted by changing the number and tangential angle of the holes 68,70.

So by adjusting the angles of the holes 68, 70, it is possible to adjust the velocity of the gas flowing through the holes 68, 70 and cavity 74 and thereby match the film coefficients of the two areas of the seal members 54, 56 so that the members will thermally grow together and thereby provide a#self-adjusting or active clearance control for the seal 12. The actively heated cavity 74 located outwardly of the casing outer seal member 56 facilitates matching of growth between rim portion 58 of the rotary outer rotor 18 and the stationary casing 52 which tends to create a more stable environment throughout the seal 12 allowing for more uniform and faster growth, and thus better clearance control yielding improved seal and engine performance.

It should be understood that the thermally-tuned rotary seal is not limited in its application to just the gas turbine engine 10 of the unducted fan type. The principles of the thermally-tuned seal can be applied to any engine structure where thermal growth matching and active seal clearance control are needed.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely preferred or exemplary embodiments thereof.

I claim:

1. A thermally-tuned rotary seal for a gas turbine engine, said seal comprising:
   (a) an inner annular seal member having a plurality of axially spaced, radially projecting annular seal elements;
   (b) an outer annular seal member having a stepped honeycomb structure facing said annular seal elements of said inner seal member and defining therewith a series of axially spaced regions bounded by said seal elements and said honeycomb structure, said annular seal elements of said inner seal member and said stepped honeycomb structure of said outer seal member cooperating to inhibit flow of gas from one region to the next;

(c) a plurality of inlet and outlet vent holes through said honeycomb structure at respective upstream and downstream ends thereof which communicate with corresponding ones of said regions, said inlet and outlet vent holes being aligned along respective planes extending relative to a longitudinal axis of the engine and said holes being disposed at angles extending in tangential directions along said radial planes;

(d) an annular housing attached on an outer side of said stepped honeycomb structure and defining a single axially elongated annular cavity spanning said stepped honeycomb structure axially from an upstream to a downstream end thereof and interconnecting in flow communication said inlet and outlet vent holes adjacent said upstream and downstream ends of said stepped honeycomb structure for providing gas flow in heat transfer relationship along said outer side of said stepped honeycomb structure from said inlet vent holes to said outlet vent holes; and (e) wherein the number of said vent holes and their tangential angle relative to a longitudinal axis of the engine are selected to provide thermal tuning of said inner and outer seal members to provide active seal clearance control.

2. The seal as recited in claim 1, wherein said inlet vent holes are disposed at an angle extending in a tangential direction along said radial plane.

3. The seal as recited in claim 2, wherein said outlet vent holes are disposed at an angle extending in a tangential direction along said radial plane.

* * * * *